March 5, 1968     A. J. GASBARRA ET AL     3,371,817
PLASTIC CONTAINER
Filed Feb. 3, 1966     2 Sheets-Sheet 1
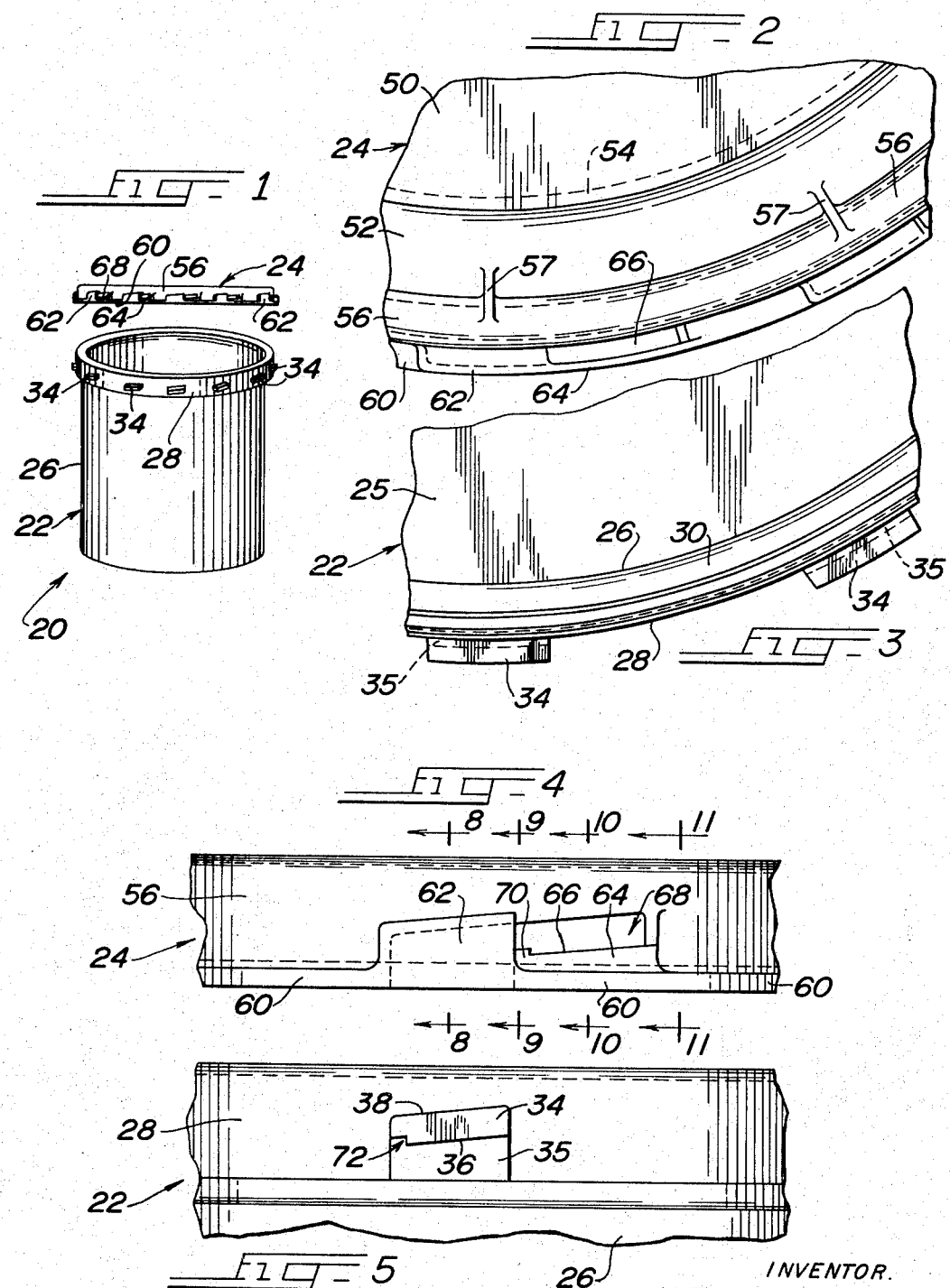
INVENTOR.
ANTHONY J. GASBARRA
ALVA J. GODSHALK
BY
Daniel W. Vittum, Jr.
ATTY.

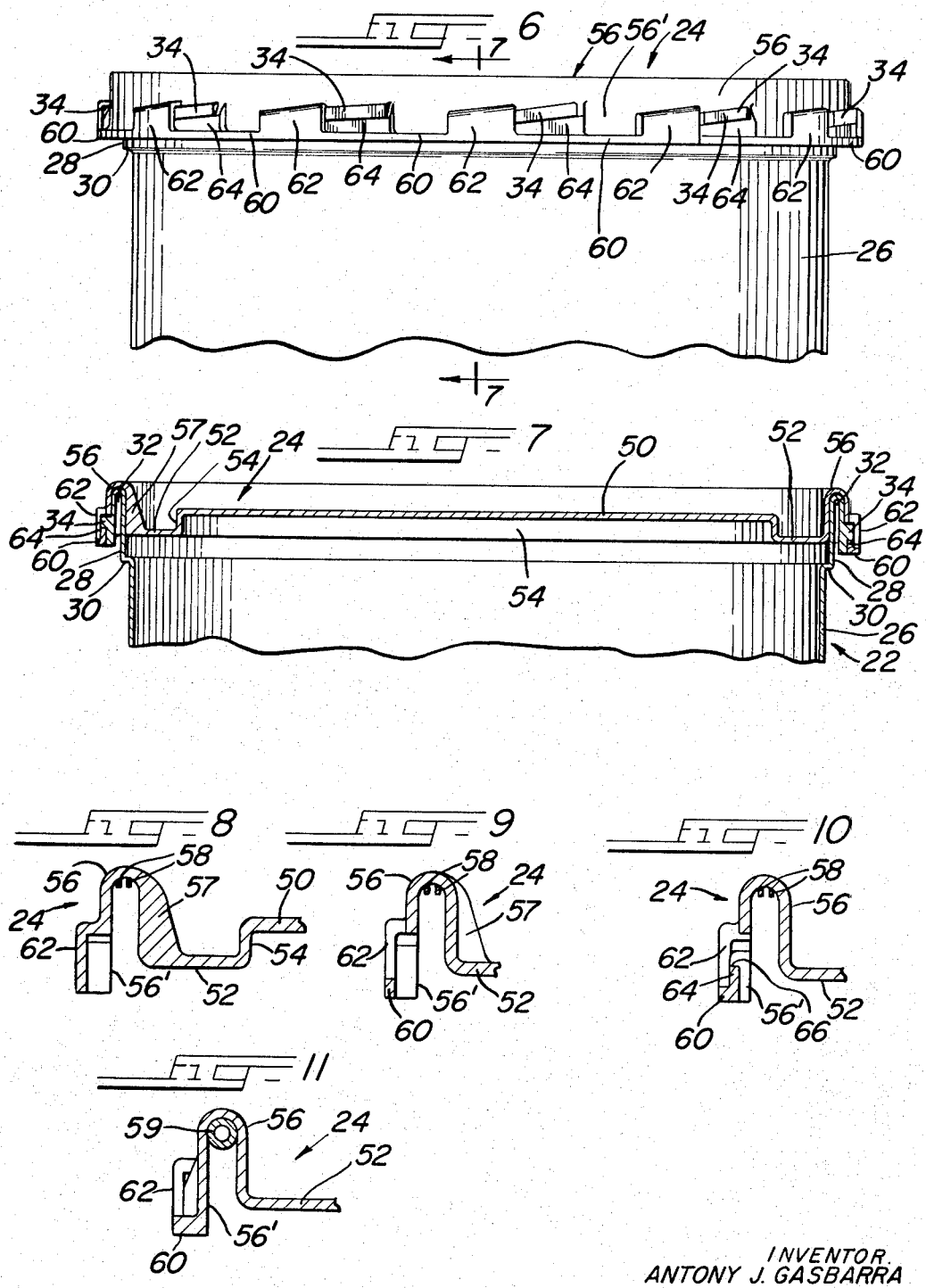

United States Patent Office

3,371,817
Patented Mar. 5, 1968

3,371,817
PLASTIC CONTAINER
Anthony J. Gasbarra, Flossmoor, and Alva J. Godshalk, Homewood, Ill., assignors, by mesne assignments, to Bennett Industries, Inc., Peotone, Ill., a corporation of Delaware
Filed Feb. 3, 1966, Ser. No. 524,780
13 Claims. (Cl. 220—40)

ABSTRACT OF THE DISCLOSURE

This invention is a plastic shipping container with a lug locking top to engage with lugs on the container for sealing engagement.

---

This invention generally relates to plastic containers and more particularly concerns cylindrical plastic drums and pails having plastic closure members removably attached thereto.

The advantages of fabricating a shipping container from plastic rather than conventional metals such as steel are obvious. A plastic container suitable for shipping and storage would be more economical than a similarly sized metal container by reason of the comparatively higher cost of conventionally utilized metals (such as steel) in relation to plastics (such as polyethylene). Moreover, problems of corrosion, which often arise with metal containers, could be avoided since plastics are generally more resistant than metals to corrosion and other similar forms of attack. Additionally, the effective substitution of plastic for metal in a commercial container could yield significant economies with respect to the weight of the resultant container. However, despite these advantages, it has not heretofore been possible to use plastics for commercially acceptable shipping and storage containers because of the difficulties involved in providing acceptable closure members for use with a plastic container body.

A container adapted to be used in packaging, storing, and shipping liquids, semi-liquids, and dry materials requires a closure member that is firmly attached to the container body in order to withstand the abuses of freight handling and shipping. In addition, such a closure member should preferably be reusable, that is, it should be possible to close, open, and reclose the container without having to employ a new closure member to reclose the container.

The use of synthetic materials such as plastic for the fabrication of shipping containers has long been impeded by the difficulty involved in providing acceptable closures therefor. Conventional methods and devices employed in connection with prior art metal containers are not suited for use with plastic container bodies. Instead, it has been necessary to redesign container closure devices and methods in order to provide container closures that may be satisfactorily employed with plastic container bodies. In addition to the difficulties experienced in providing mechanically compatible closures for plastic containers, problems of strength and stability have impeded the widespread use of plastic shipping containers. Thus, the union between a closure member and a container body must be capable of withstanding the stress and strain of normal use for shipping purposes. In particular, an effective fluid-tight seal adapted to withstand both internal and external pressures must be provided.

In accordance with the present invention, it has been found that a highly useful all plastic container can be obtained by employing a container body and closure member combination of the following design. The container body comprises a cylindrical side wall and a bottom wall molded integrally therewith at one end of the body, the other end of the body being open. Preferably, means are provided for re-enforcing the cylindrical side wall adjacent the open end of the container body. A plurality of integrally molded lug means are provided on the container body adjacent the open end thereof, and each of the lug means has a lower surface that is inclined at an angle with the horizontal in at least one plane.

The closure member comprises a generally flat molded plastic disc provided with a depending portion adapted to fit over the open end of the container body. The depending portion is offset outwardly at a plurality of points in order to provide clearances for the plurality of lugs on the container body. Preferably, sealing means are provided between the closure member and the container body in order to effect a fluid-tight seal therebetween. A plurality of integrally molded mating lugs are provided on the closure member, each mating lug being disposed adjacent one of the clearances and having its upper surface inclined at an angle with the horizontal in at least one plane. An opening is provided in the depending portion of the closure member above each mating lug.

Thus, when the closure member is positioned over the open end of the container body so as to receive the lugs on the container body within the clearances formed in the depending portion of the closure member and relative rotational motion between the closure member and the container body is effected, the inclined surfaces on corresponding pairs of lugs and mating lugs cooperate to draw the closure member tightly onto the container body. Preferably, detent means are provided in order to lock the closure member in position on the container body. In addition, the lower surface of the lugs and the corresponding upper surface of the mating lugs are preferably inclined at an angle with the horizontal in two planes in order to enhance the strength of the interlocking arrangement between the closure member and the container body.

Thus, a primary object of the present invention is to provide an all plastic shipping container comprising a container body and a closure member adapted to be interconnected therewith by means of a novel interlocking arrangement.

Another object of the present invention is to provide a container of the character described in accordance with which a strong, tight, fluid-tight seal is effected between the closure member and the container body.

Yet another object is to provide a novel interlocking lug arrangement adapted for use in interconnecting a plastic container closure with a plastic container body which features ease of entry and reclosure.

These and other objects, advantages, and features of the subject invention will hereinafter appear and, for purposes of illustration, but not of limitation, an exemplary embodiment of the present invention is illustrated in the accompanying drawing, in which:

FIGURE 1 is a perspective view of a container produced in accordance with the present invention;

FIGURE 2 is a fragmentary plan veiw of the closure member of the container shown in FIGURE 1;

FIGURE 3 is a fragmentary plan view of the container body shown in FIGURE 1;

FIGURE 4 is a fragmentary side elevational view of the container closure;

FIGURE 5 is a fragmentary, side elevational view of the body portion thereof;

FIGURE 6 is a side elevational view of the container with the closure member locked in position on the body portion;

FIGURE 7 is a fragmentary sectional view taken substantially along line 7—7 in FIGURE 6;

FIGURE 8 is a fragmentary sectional view taken substantially along line 8—8 in FIGURE 4;

FIGURE 9 is a fragmentary sectional view taken substantially along line 9—9 in FIGURE 4, FIGURE 10 is a fragmentary sectional view taken substantially along line 10—10 in FIGURE 4; and FIGURE 11 is a fragmentary sectional view taken substantially along line 11—11 in FIGURE 4.

With reference to the drawing, FIGURE 1 illustrates a container 20 comprising a container body 22 and a closure member 24. Container 20 is preferably formed from a suitable semi-rigid plastic having strength sufficient to withstand the abuses to which a shipping container is subjected in normal use. Linear, high density polyethylene is an especially suitable plastic material, although other plastics of the polyolefin or petrochemical family may be employed. An especially preferred plastic is polyethylene having a density ranging between 0.941 and 0.965 gram per cubic centimeter (ASTM Test D–1505–60T) and a melt index ranging between 0.1 and 9.0 (ASTM Test D–1238–57T). Where the latter preferred polyethylene is employed in producing a blow-molded container, the melt index preferably ranges between 0.1 and 0.5, whereas when it is employed in producing an injection molded container, the melt index preferably lies between 4.0 and 9.0.

The container body 22 is shown in detail in FIGURES 1, 3, and 5. The body 22 comprises a generally cylindrical side wall 26, a bottom wall 25 being integrally molded therewith. The side wall 26 may be truly cylindrical as shown in the drawing, or the side wall 26 may be tapered inwardly in a downward direction in order to facilitate nesting or stacking of the container body 22, as is well known in the art.

An inverted U-shaped rim 28 is formed adjacent the open end of the container body 22 (see especially FIGURE 7). The satisfactory functioning of the closure arrangement of the present invention is related to the rigidity of the open end of the container body 22. For this reason, rim 28 is offset outwardly slightly from cylindrical wall member 26 in order to form a generally horizontal ledge 30. Ledge 30 is disposed substantially at a right angle with the wall member 26 in order to impart strength and rigidity to the open end of the container body 22. In addition, a plurality of webs 32 (see FIGURE 7) are provided at intervals within the U of rim 28 in order to impart strength to rim 28.

A plurality of rectangular parallelepipedonal lugs 34 are provided about the periphery of the rim 28. Each lug 34 has a lower surface 36 (see FIGURE 5) which is inclined with the horizontal, for a purpose that will hereinafter appear. The upper surface 38 of each lug is inclined with the horizontal at a like angle in order to provide the preferred generally rectangular parallelepipedonal configuration. The outer portion of rim 28 is thickened beneath each lug 34, as indicated by the reference numeral 35 (see FIGURES 3 and 5). In this manner, a stronger, more durable lug 34 is obtained and the danger of tearing or breaking lug 34 from rim 28 is minimized. Of course, other lug configurations may be employed so long as the inclined lower surface 36 is provided.

Closure member 24 is best illustrated in FIGURES 1, 2, 4, and 7. The closure member 24 comprises a generally flat center disc-like portion 50, which is provided with a downwardly offset flange 52 interconnected therewith by means of an integrally formed vertical connecting member 54. The combination of center portion 50, flange 52, and ledge 54 serves to impart strength and durability to the closure member 24.

An inverted U-shaped channel 56 is provided around the periphery of flange 52. Inverted channel 56 is larger than inverted U-shaped rim 28 so that channel 56 fits over rim 28 when closure member 24 is positioned over the open end of container body 22. A plurality of strength imparting webs 57 are provided between channel 56 and flange portion 52 at various points in order to lend strength and rigidity to U-shaped channel 56 (see FIGURES 7–11).

A pair of depending ribs 58 are provided inside inverted channel 56 at its apex and, when closure member 24 is positioned over container body 22, ribs 58 are deformed against inverted U-shaped rim 28 in order to form a fluid-tight seal between the closure member and the container body (see FIGURES 8–10). An alternative sealing arrangement is shown in FIGURE 11, in which a conventional annular sealing gasket 59 is positioned inside channel 56 at its apex. As will be obvious to one skilled in the art, gasket 59 would be deformed against rim 28 when closure member 24 is positioned over the container body.

As best shown in FIGURES 8–11, U-shaped channel 56 has an outer downwardly extending leg 56'. An outwardly projecting flange 60 is provided on leg 56' along its lower edge, as best shown in FIGURE 11. At various points around the periphery of channel 56, leg 56' is deformed outwardly, as indicated by the reference numeral 62, to provide a clearance for the plurality of lugs 34 on the container body 22. Thus, when the closure member 24 shown in FIGURE 4 is moved directly downwardly over the container body 22 shown in FIGURE 5, lug 34 shown in FIGURE 4 passes upwardly inside the deformed portion 62 of leg 56' of the closure member 24 shown in FIGURE 5.

Adjacent each of the clearances 62, a lug 64 is formed on the flange 60. The upper surface 66 of each lug 64 is inclined with the horizontal at the same angle as the lower surface 36 of each corresponding lug 34 on the container body 22. A plurality of openings 68 (see FIGURE 4) are provided in leg 56'. Each opening 68 is contiguous with the space formed by the outward deformation of leg 56' to form the corresponding clearance 62. Thus, as the closure member 24 is positioned over the container body 22, each lug 34 passes upwardly inside the corresponding clearance 62 to a point above the upper surface 66 of the corresponding mating lug 64 on the closure member. When closure member 24 is then rotated in a clockwise direction relative to the container body 22, surfaces 36, 66 cooperate to pull the closure member downwardly tightly against the container body, the sealing ribs 58 (or the sealing gasket 59) being forced against rim 28, whereby a tight seal is effected between the closure member and the container body. The inclined surfaces of lugs 34 and corresponding mating lugs 64 translate the relative rotational motion between the cover member 24 and the container body 22 into vertical movement of the closure member toward the container body. The relative position of lugs 34 and corresponding mating lugs 64 with the closure member in its locked position is shown in FIGURE 2 of the drawing.

Preferably, the lower surface 36 of each lug 34 and the upper surface 66 of each lug 64 are inclined at an angle with the horizontal in two planes. As best shown in the FIGURE 7 sectional view, in addition to the inclination along the length of the respective surfaces 36, 66, such surfaces are also inclined downwardly from the inside of the container toward the outside thereof. This inclination of the surfaces in a second plane functions to further secure the closure member to the container body and to prevent the closure member from becoming separated from the container body due to dropping or other impact-type shock.

Detent means are preferably employed in order to lock the closure member 24 in position on the container body 22. A molded detent stop 70 (shown only in FIGURE 4) may be provided at the lowermost end of surface 66 of each lug 64. A cooperating recess 72 (shown only in FIGURE 5), adapted to receive the detent stop 70, is provided at the lowermost end of surface 66 of each lug 64. When the closure member 24 is positioned on the container body 22 and rotated with respect thereto, after the respective surfaces 66, 36 have cooperated to pull the container member tightly into position onto the container body, the recess 72 drops over the detent stop 70 in each of the lug combinations in order to firmly lock the closure member in position.

Where the detent stop arrangement is employed to lock the closure member in position on the container body, when it is desired to open the container, it is necessary to apply sufficient rotational force to the closure member in order to cause recess 72 to pass over detent stop 70.

The present invention, thus, provides a new and unique closure arrangement which permits all parts of the container to be fabricated from plastic. In particular, the use of the interlocking lug arrangement provides a closure member-container body combination that can be easily closed, opened, and reclosed a number of times.

In addition, use of the previously described detent locking means provides a means for securing the closure member to the container body in order to preclude accidental loosening or removal thereof. Finally, sealing means employed in connection with the novel interlocking arrangement permits a fluid-tight seal to be effected between the closure member and the container body.

It should be understood that various changes, variations, and modifications in structure and function may be effected in the present invention without departing from the spirit and the scope thereof, as defined in the appended claims.

What is claimed is:

1. A container comprising in combination:
   an open end molded plastic container body having a generally cylindrical side wall and a bottom wall molded integrally therewith at one end of the body, the other end of the body being open;
   a plurality of lug means molded integrally with the side wall adjacent the open end of the container body, each of the lug means having a lower surface that is inclined at an angle with the horizontal in at least one plane;
   a generally disc-shaped molded plastic closure member having a depending portion adapted to fit over the open end of the container body,
   the depending portion of the closure member being offset outwardly at a plurality of points to provide clearances for the plurality of lugs on the container body;
   a plurality of mating lugs molded integrally with the closure member, each mating lug being disposed adjacent one of the clearances and having its upper surface inclined with the horizontal in at least one plane,
   an opening being formed in the depending portion of the closure member above each of the mating lugs,
   whereby when the closure member is positioned on the container body such that the lugs on the container body are received within the clearances and thereafter relative rotational motion between the closure member and the container body is effected, the inclined surfaces on corresponding pairs of lugs and mating lugs cooperate to draw the closure member tightly onto the container body.

2. A container, as claimed in claim 1, and further comprising sealing means adapted to effect a fluid-tight seal between the closure member and the container body when the former is drawn tightly onto the latter.

3. A container, as claimed in claim 1, and further comprising means for reinforcing the cylindrical side wall of the container body adjacent the open end thereof.

4. A container, as claimed in claim 1, and further comprising reinforcing means adapted to impart strength and rigidity to the closure member.

5. A container, as claimed in claim 1, wherein the lower surface of the lugs on the container body and the upper surface of the mating lugs on the closure member are inclined with the horizontal in two planes.

6. A container, as claimed in claim 1, and further comprising detent locking means for maintaining the closure member and container body in locked condition after the former has been tightly drawn onto the latter.

7. A container, as claimed in claim 1, wherein the closure member and container body are fabricated from high density polyethylene.

8. A container, as claimed in claim 1, wherein an inverted generally U-shaped downwardly facing rim is provided on the container body at the open end thereof and wherein the depending portion of the closure member forms the outer leg of an inverted generally U-shaped channel adapted to fit downwardly over the rim on the container body.

9. A container, as claimed in claim 8, and further comprising sealing means adapted to be placed within the inverted U-shaped channel on the closure member and adapted to effect a fluid-tight seal between the closure member and the container body when the former is drawn tightly onto the latter.

10. A container, as claimed in claim 9, wherein the sealing means comprises a pair of annular molded plastic ribs formed inside the channel at the apex thereof.

11. A container, as claimed in claim 9, wherein the sealing means comprises an annular flexible gasket adapted to be disposed within the channel at the apex thereof.

12. A container, as claimed in claim 8, wherein the downwardly facing rim on the container body is offset outwardly whereby said rim is interconnected with the remainder of the side wall of the container body by an integrally molded ledge which is formed at substantially a right angle with the rim and the side wall, the ledge serving to reinforce the cylindrical side wall adjacent its open end.

13. A container, as claimed in claim 8, wherein the closure member and container body are fabricated from high density polyethylene.

References Cited
UNITED STATES PATENTS 2,907,491 10/1959 Gunn _____ 220—40
3,312,336 4/1967 Fally _____ 220—40

THERON E. CONDON, *Primary Examiner.*

J. B. MARBERT, *Assistant Examiner.*